May 27, 1924.  
F. W. MERRICK  
1,495,960  
MACHINE FOR CUTTING SHEET MATERIAL INTO CONTINUOUS STRIPS  
Filed June 1, 1922  
5 Sheets-Sheet 1
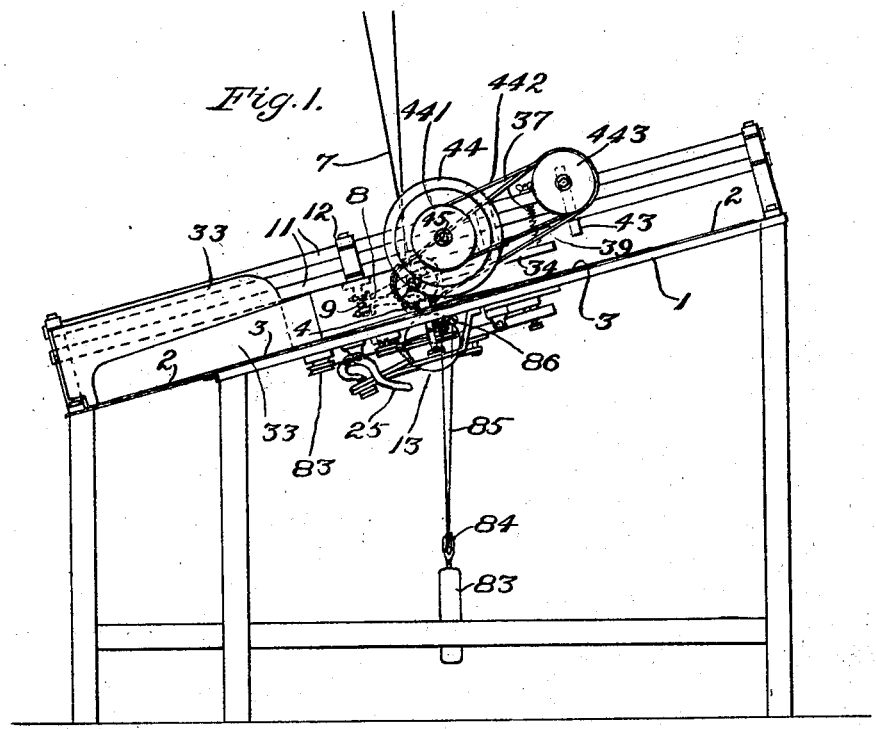
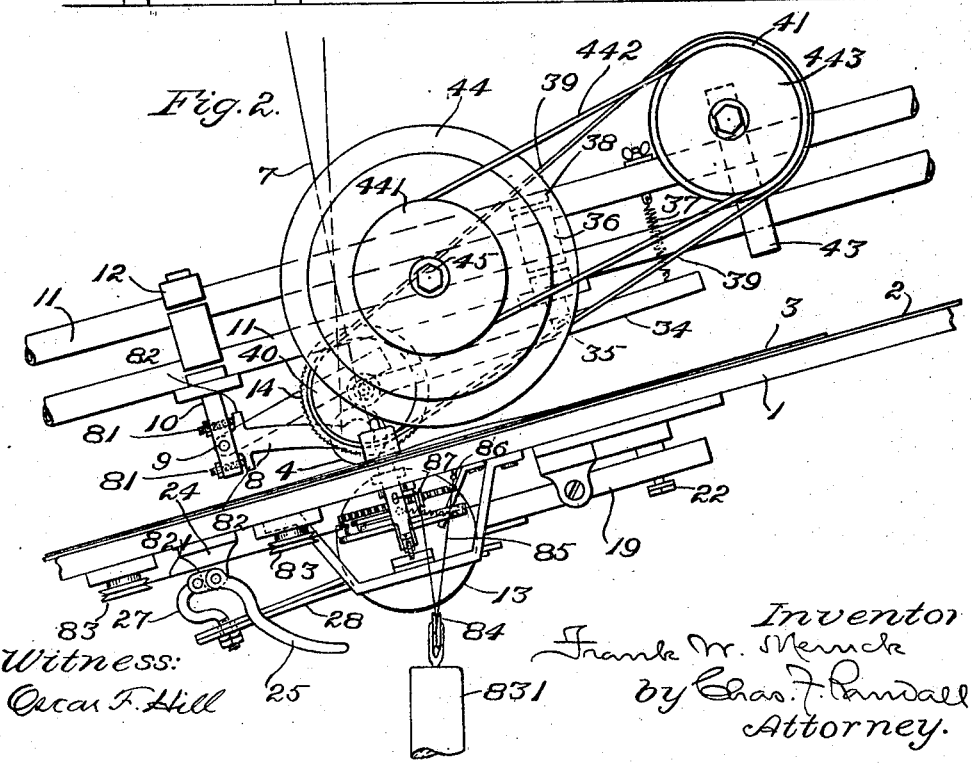

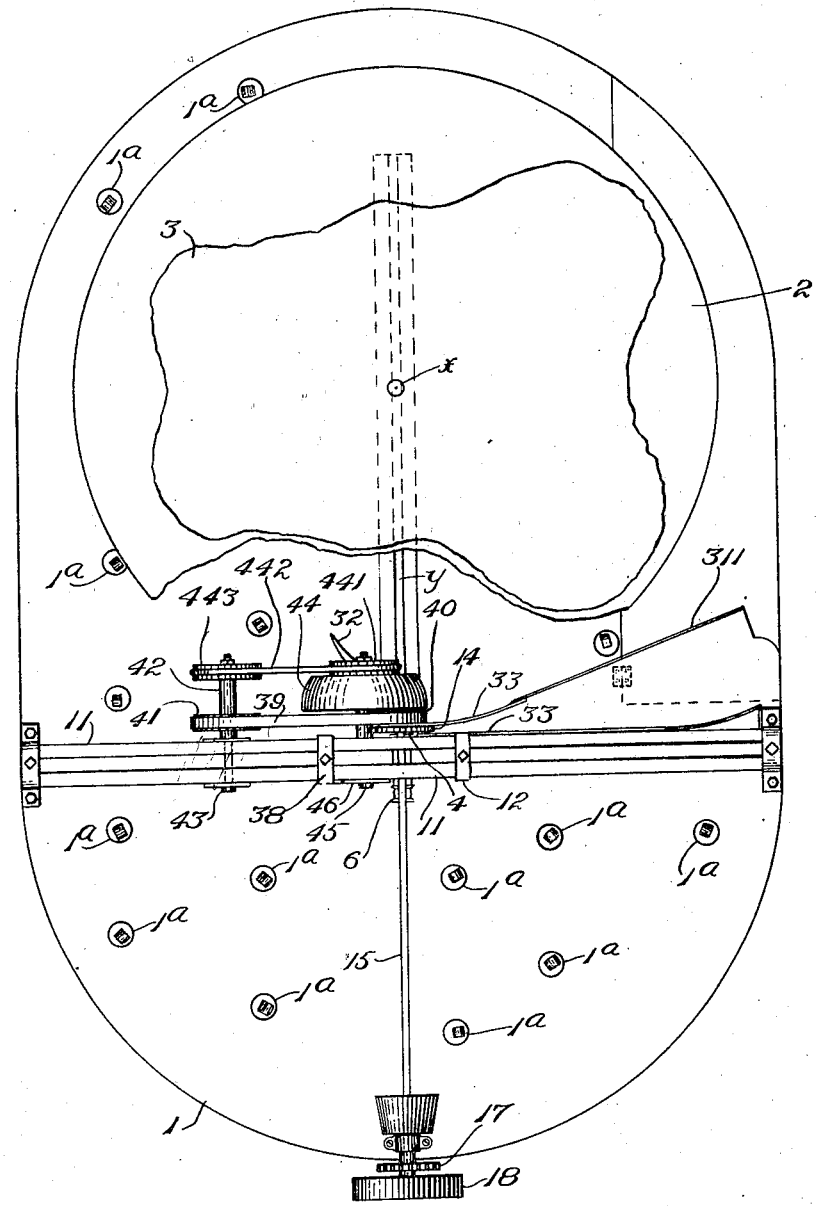

May 27, 1924.  1,495,960
F. W. MERRICK
MACHINE FOR CUTTING SHEET MATERIAL INTO CONTINUOUS STRIPS
Filed June 1, 1922  5 Sheets-Sheet 3
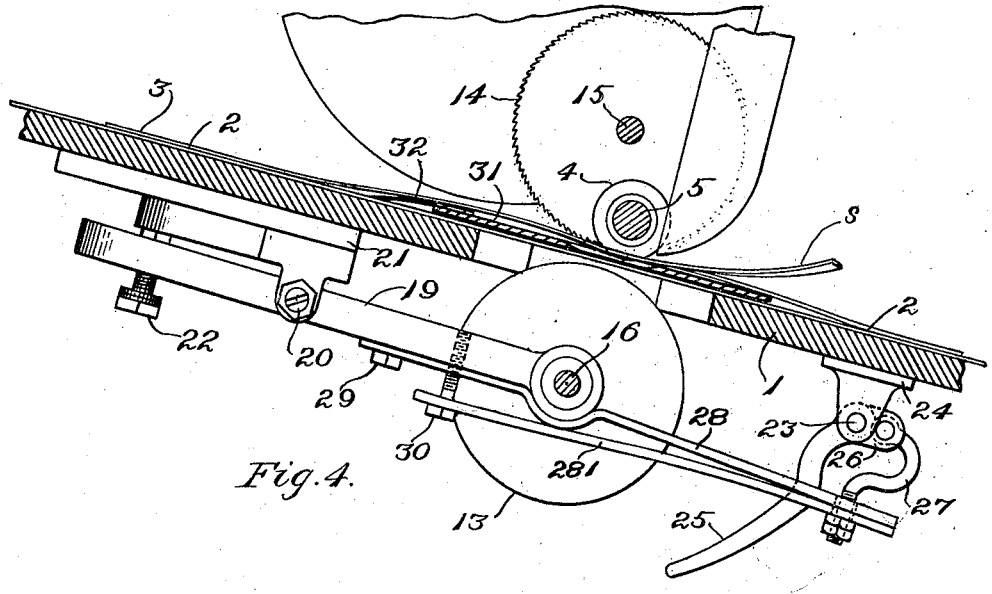
Fig. 4.
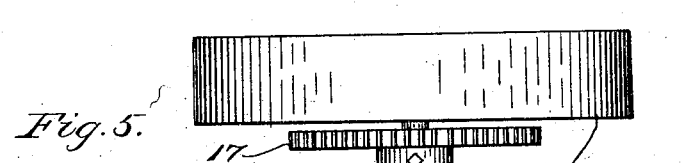
Fig. 5.
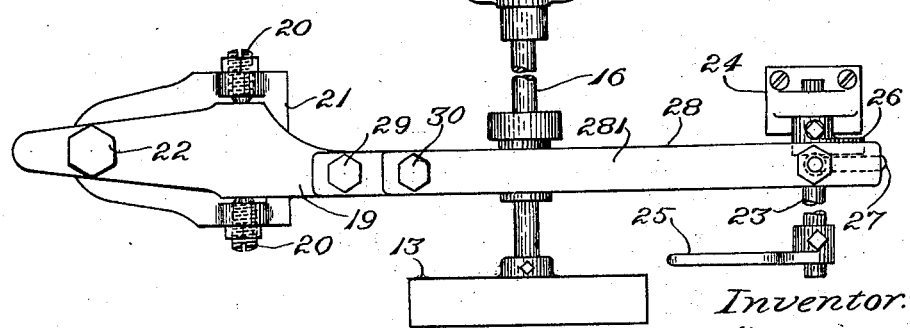
Witness:
Oscar F. Hill
Inventor:
Frank W. Merrick
by Chas. F. Randall
Attorney.

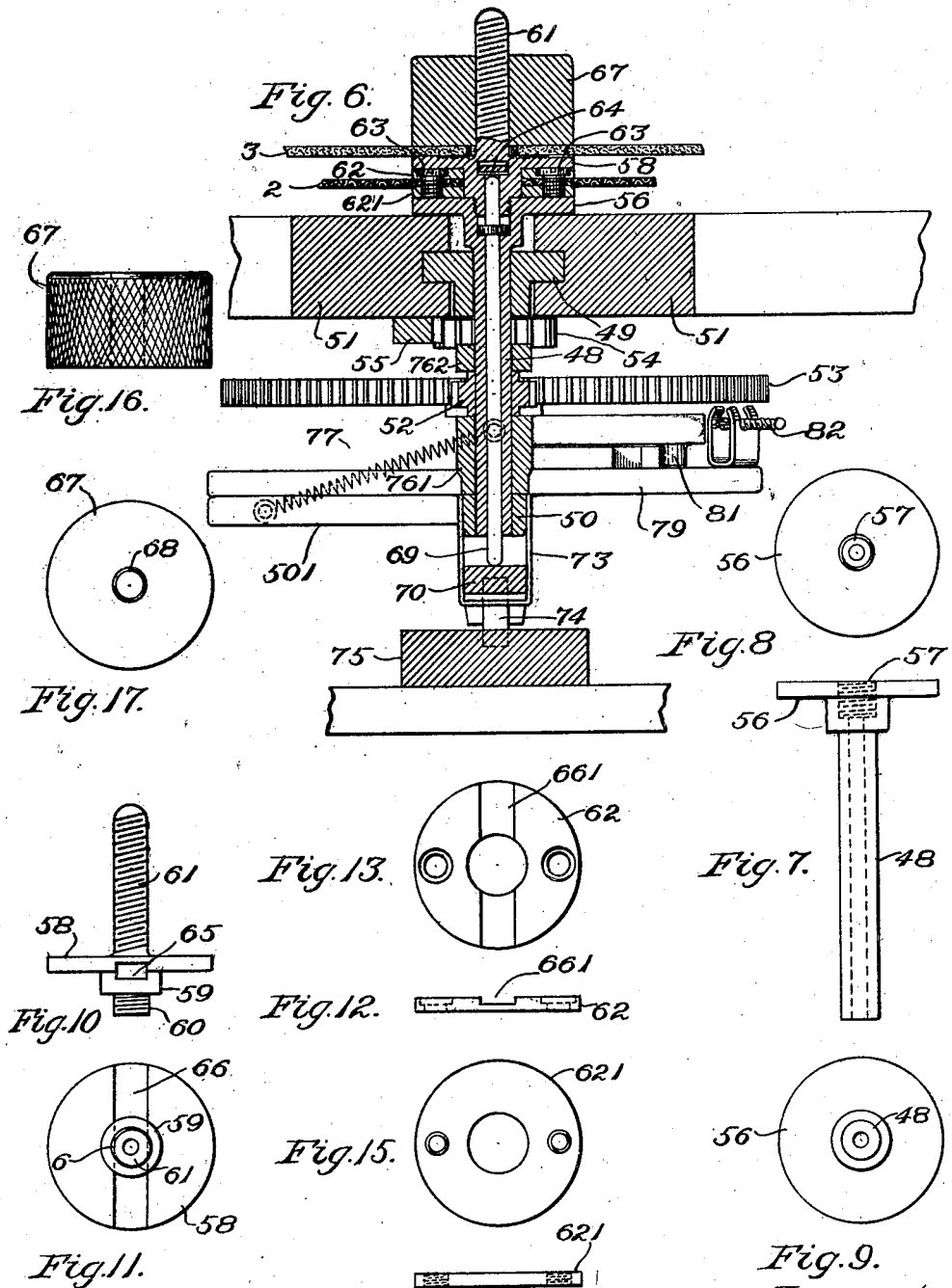

May 27, 1924.  1,495,960
F. W. MERRICK
MACHINE FOR CUTTING SHEET MATERIAL INTO CONTINUOUS STRIPS
Filed June 1, 1922  5 Sheets-Sheet 5
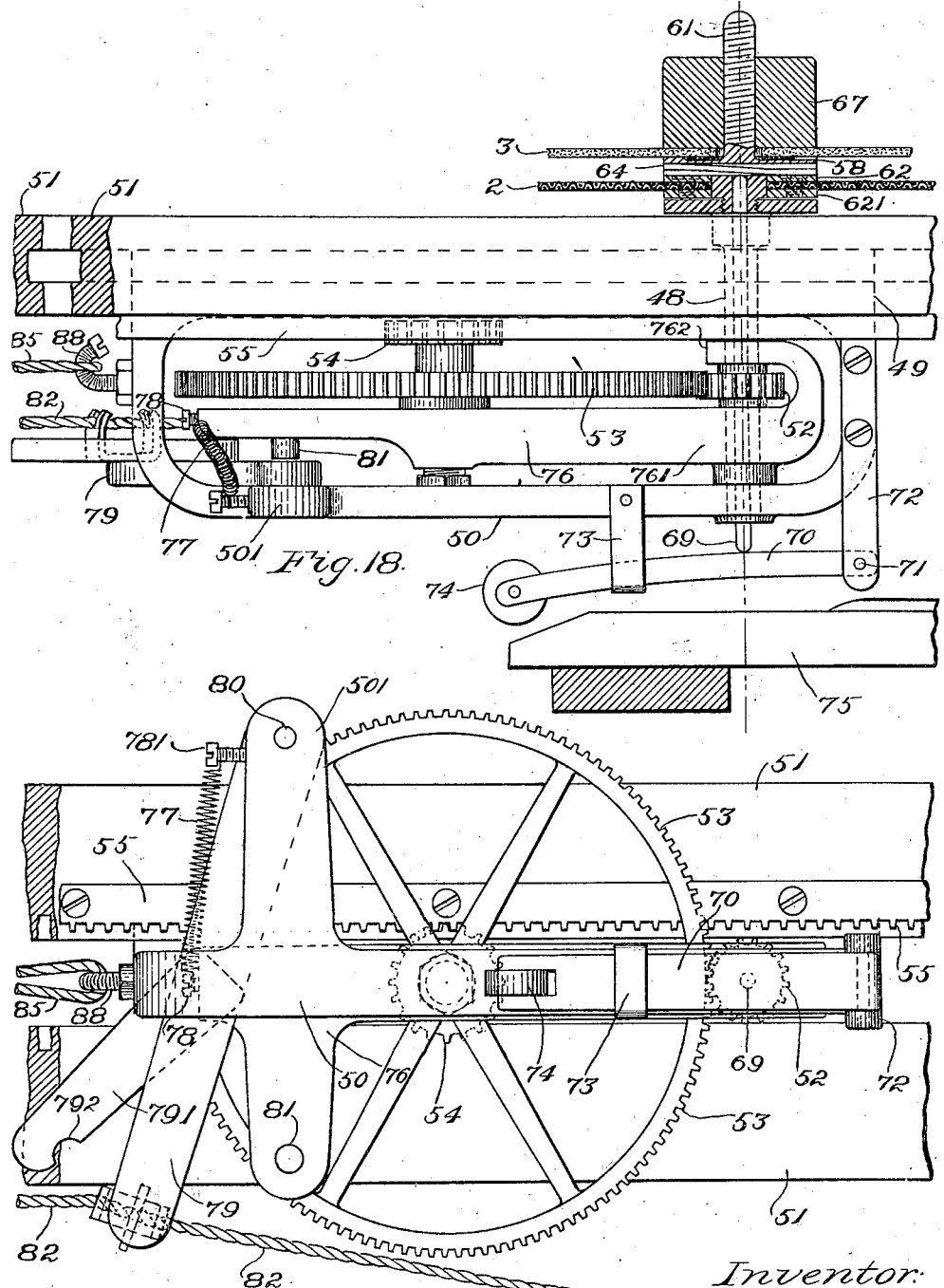

Patented May 27, 1924.

1,495,960

UNITED STATES PATENT OFFICE.

FRANK W. MERRICK, OF DORCHESTER, MASSACHUSETTS, ASSIGNOR TO AMERICAN STAY COMPANY, OF BOSTON, MASSACHUSETTS, A CORPORATION OF MASSACHUSETTS.

MACHINE FOR CUTTING SHEET MATERIAL INTO CONTINUOUS STRIPS.

Application filed June 1, 1922. Serial No. 565,046.

*To all whom it may concern:*

Be it known that I, FRANK W. MERRICK, a citizen of the United States, residing at Dorchester, Boston, in the county of Suffolk, State of Massachusetts, have invented a certain new and useful Improvement in Machines for Cutting Sheet Material into Continuous Strips, of which the following is a specification, reference being had therein to the accompanying drawings.

The invention has relation to machines of the class designed for cutting sheet material, for instance a hide or skin of leather, along a spiral line into a continuous strip. More particularly, it relates to machines of the type in which the sheet material is revolved around its own center of revolution relative to a cutting device, so as to feed the margin of the sheet material progressively to the said cutting device, and in which also the center of revolution is advanced gradually toward the cutting device so as to cause the cutting to take place along the required spiral line.

The machine of my prior Letters Patent for impt. in machines for cutting leather, etc., into continuous strips, No. 874,102, granted Dec. 17, 1907, is constructed to cause the revolution of a sheet of leather, while being operated upon, to be produced solely by the action of feed-rolls adjacent the cutter engaging with the uncut marginal portion of the sheet. With such machine, it is necessary, before beginning operation on the machine, to trim the sheet to a circular or disk-like form.

One general object of the present invention is to enable a hide or skin of the irregular contour usual in the case of hides or skins as purchased in the market, or other piece of leather or other sheet material of any contour whatsoever as it comes to hand, to be placed in a machine embodying the invention, and operated upon by such machine without any preliminary trimming involving removal of projections, corners, etc., and reduction to circular form. Another object thereof is to provide for cutting the said projections, corners, etc., into strips adapted to be utilized by piecing them together into a continuous strip.

The main and characteristic feature of the present invention is a revoluble table or platform serving as a support and carrier for the hide or skin or other sheet material placed in the machine to be operated upon. The said revoluble table supports the projecting portions, corners, etc., of the hide or skin, etc., and by its revolution carries them successively around to and past the cutter. Means for revolving the table is provided, adapted to be rendered operative to produce revolution thereof when desired, and to be rendered inoperative as required; and feeding means adapted to engage with the projecting portions, etc., of the hide or skin as they arrive at and pass the cutter, and also with the marginal portion of the main body of the hide or skin after it has assumed a circular form. The machine includes, further, various novel features of construction and combinations of parts.

A machine comprising an illustrative embodiment of the features of the invention is shown in the drawings, in which latter,—

Fig. 1 is an end elevation of the said machine.

Fig. 2 is a similar view of the essential parts of the said machine, on a somewhat larger scale than Fig. 1.

Fig. 3 is a plan view of the machine, with the revoluble table partially broken away.

Fig. 4 is a view in section in a vertical plane, looking toward the cutter and the presser and feed-disks from the end of the machine opposite that shown in Figs. 1 and 2.

Fig. 5 is a bottom view of the lower feed-disk and the parts which are associated therewith.

Fig. 6 is a view in cross-section in a plane extending from front to rear, showing the revoluble and traveling "center" for the revolving apron and the sheet material which is operated upon in the machine, and some of the parts which are associated with the said center.

Figs. 7 to 17 are views of the details of the said "center".

Fig. 18 is a view mainly in rear elevation, with the upper portion of the center and also the apron and sheet material in vertical section, showing the center, its carriage, portions of the carriage guides, and the devices for unclutching the revoluble table from the carriage-traversing means.

Fig. 19 is a bottom view of the parts shown in Fig. 18.

The machine shown in the drawings has a bed 1 which (as indicated in Figs. 1, 2 and 4) is inclined upwardly toward the back of the machine from the front thereof, the front being the side of the machine at which the operator stands, such being the left-hand side in Figs. 1 and 2 and the right-hand side in Figs. 3 and 4. The upper surface of this bed supports the revoluble table 2, which has the same inclination as the bed; and the sheet 3 (Figs. 3, 6 and 18) of flexible material operated upon, which for convenience is represented by a hide or skin of leather, rests upon said table. The inclination of the bed and table is for the convenience of the operator, it facilitating the spreading of the hide or skin, or other sheet material, upon the table, and the manipulation of the hide or skin and table, by rendering them more fully visible and accessible. The revoluble table, which herein is constituted of a disk of heavy woven material, and the hide or skin of leather resting thereon, are engaged with the so-called center, which is indicated at $x$ in Fig. 3, and around the axis thereof they revolve in unison during the cutting operation. The details of construction of the center, hereinafter explained, are shown in Figs. 6 to 19. The center $x$ is movable toward and from the cutter along a guideway extending transversely of the machine, such guideway being indicated at $y$, Fig. 1, and also more fully illustrated in Figs. 6, 18 and 19. At the beginning of operations, the center occupies a position at a distance laterally from the cutter, usually at or near the far end of the guideway, and while it occupies such position the leather is laid upon the revoluble table and engaged with the center. The center is then advanced by the operator along the guideway $x$ until one or more of the marginal portions of the leather has been brought close to the cutter, and an adjacent portion of the revoluble table at approximately the same distance from the center has been placed in position for engagement with the feed-device for revolving said table around the axis of the center. Rollers 1ª, 1ª, Fig. 3, located at various points of the said surface facilitate this traveling movement of the revoluble table and the leather, and also the turning movements thereof during the operation of the machine.

The cutter 4, Figs. 2 and 4, by means of which the leather is cut into strip-form is located at an intermediate point in the length of the bed 1, conveniently adjacent the inner end of the guideway. In some cases the form, etc., of the cutter may be varied, as found or deemed advisable. In this present instance the cutter 4 is a disk-cutter mounted upon the inner end of a short shaft 5, Fig. 4, extending lengthwise of the machine, above the bed 1. The said shaft is furnished with a pulley 6, Fig. 3, around which passes a driving band 7, Figs. 1 and 2, by means of which the shaft and cutter are rotated. The bearing in which shaft 5 is mounted is vertically movable, in order to enable the cutter to be adjusted vertically into the desired cutting position. In this instance the vertical adjustment is provided for by means of upper and lower adjustment screws 81, 81, carried by support 10 and engaging with lugs 82, 82, projecting from the swinging support 8 above and below the fulcrum of the latter. By means of these adjustment screws the edge of the cutter may be adjusted to a nicety with relation to the plate 31 and the surface of the revoluble table 2. Herein the said bearing is provided in connection with a vertically swinging support 8, Figs. 1 and 2, which is pivoted at 9 to a support 10 in connction with two pairs of elevated supporting rails 11, 11, Figs. 1, 2, 3, extending from front to rear of the machine. By means of a clamp 12 the support 10 is secured in place upon said rails with capacity for adjustment in the direction from front to rear, so that the cutter may be adjusted in such direction to present the acting portion thereof in position to cut in a line approximately tangential to a circle described around right angles at the end of a radial line extending from the center $x$. The plane of the cutter departs just sufficiently from a tangent to enable the cutter to "draw" slightly, which improves the cutting action and ensures greater uniformity in the width of the strip cut from the material.

Provision is made, as previously indicated herein, for producing revolution of the table 2 and the leather resting thereon around the axis of the center. In this instance, such revolution is produced by means of devices adapted to engage with each thereof in proximity to the cutter, in order to ensure a substantially uniform rate of peripheral speed of the hide or skin, or other piece of sheet material operated upon. To this end, in the illustrated machine a pair of feed-disks 13, 14, Fig. 4, is located adjacent the cutter. The lower one, 13, is designed to engage with the under surface of the table 2, and the upper one, 14, is designed to engage with the upper surface of the piece of leather 3. The respective feed-disks have frictional or other suitable engaging peripheries for more effectual driving engagement with the revoluble table and leather. In the present case, disk 14 is shown as having a toothed periphery, and disk 13 is supposed to be clothed with smooth frictionally adhesive surfacing. The two feed-disks are mounted, respectively, upon the inner ends of two shafts, 15, 16, Figs. 3, 4 and 5, one above the other, which are geared together by spur-gears 17 at their outer ends to cause them to revolve in unison. One of said shafts is furnished with a driving-band pulley 18 to which driving power is applied by means of a driving band, not shown.

I mount the lower feed-disk in a manner enabling it to occupy either a position in engagement with the under side of the revoluble table, or one in which it does not engage with the said table. To this end, the inner portion of the shaft 16 of the said feed-disk in the illustrated machine is mounted in a bearing provided in connection with a vertically swinging supporting arm 19. The said arm is supported pivotally by center-screws 20, 20, carried by lugs of a stand 21 attached to the under side of bed 1. The extent of the movement of the lower feed-disk downward away from the under side of the revoluble table is limited by means of an adjustable stop-screw 22 applied to the supporting arm 19 at the opposite side of the center-screws from that at which the lower feed-disk is mounted and adapted to strike against the under side of the plate-portion of stand 21 as the lower feed-disk is depressed away from the revoluble table. I provide means for enabling, at the will of the operator, the lower feed-disk to be moved upward into its working position, in engagement with the under side of the revoluble table, or to be moved downward away from such position, into the inoperative relations with respect to the revoluble table in which it is shown in Fig. 4. In the illustrated machine such means is constituted by a rocker-arrangement shown in Figs. 1, 2, 4 and 5, connected with the supporting arm 19 and comprising a rocker 23 journalled in a bearing in connection with a stand 24 attached to the under side of bed 1, an operating handle 25 projecting from said rocker, a crank-arm 26 which is a part of the rocker, and a link 27 connecting the said crank-arm to an extension 28 from the supporting arm 19. By means of this rocker-arrangement the operator may swing the lower feed-disk down into its inoperative position represented in Fig. 4, so as to enable him to move the revoluble table transversely into position over such feed-disk, or withdraw it from such position, or to disengage the said feed-disk from the revoluble table when the driving action of the lower feed-disk upon the revoluble table is to be suspended; or he may swing the said feed-disk up into operative postion, in engagement with the under side of the revoluble table, for the purpose of revolving the latter. In order to lock the parts with the lower feed-disk in engagement with the under surface of the revoluble table, the rocker is so formed that the turning movement thereof which raises the lower feed-disk carries the crank past the center on which the rocker rocks, the link 27 being curved, as shown, to reach around the rockshaft. To render the upward pressure of the lower feed-disk yielding, the extension 28 from the supporting arm 19 is made of spring material. In this instance the said extension is composed of two strips of steel (or other suitable elastic material) and the lower end of link 27 is engaged with the outer ends of the said strips. One of such strips has a bend therein fitting the rounded exterior of the enlargement on arm 19 containing the bearing for shaft 16, and its inner end is fastened by a screw 29 to the under side of arm 19. The other (281) of the strips makes contact with the exterior of the bend of the strip first mentioned, and is engaged at its inner end with an adjustment screw 30 carried by the arm 19. By adjustment of this screw 30 so as to cause the second strip (281) to bear with more or less force against the bend of the first strip the tension of the extension may be adjusted to regulate the upward pressure of the lower feed-disk against the under side of the revoluble table.

For the purpose of supporting the leather above and clear of the revoluble table at and adjacent the cutting point in the machine, and avoiding contact of the cutter with the revoluble table, and in addition holding down the revoluble table, a separating plate 31, Figs. 3 and 4, is located between the two feed-disks. This separating plate is designed to intervene between the revoluble table and the leather at and adjacent the cutting point in the machine. It constitutes a cutting table.

The lower feed-disk 13, when raised from its lowered position in Fig. 4, in which its periphery is clear of the under surface of the revoluble table, into a position in which it presses the revoluble table against the under surface of the separating plate, acts through its engagament with the under surface of the revoluble table to cause the latter to revolve around the axis of the center $x$.

To separate the leather from the revoluble table and guide it on to the upper surface of the separating plate or cutting table 31, a lifter 32, Figs. 3 and 4, constituted by a thin-edged strip or plate of metal is attached to the separating plate or cutting table 31, it projecting rearward from such plate and inclining at its free end toward the surface of the revoluble table, but permitting the latter to enter between it and the surface of bed 1 of the machine. This lifter acts, in the preliminary stages of the cutting, before the leather has been rounded off into practically uniform circular form, to lift corners and other projecting portions of the leather as they approach the cutter in the revolution of the revoluble table and leather, so that they will not enter beneath the said plate and the revoluble table, but will be guided to the top surface of the plate and be subjected to the pressure and feeding action of the upper feed-disk, as well as to the cutting action of the knife, as they pass the cutting point in the machine.

The downward pressure of the upper feed-disk compresses the leather passing under the periphery of the said disk against the upper surface of the separating plate or cutting table 31, and the engagement of the said periphery with the leather tends to produce revolution of the leather around the said axis. By the holding down and feeding action of the upper feed-disk projecting portions, corners, and the like, are held down in place upon the plate 31 so that they shall be cut properly as they pass the cutter.

To cause the upper pressure-disk to bear upon the leather with the proper degree of force, the inner portion of the shaft 15 of the upper feed-disk is mounted in a bearing in connection with one arm of a lever-like supporting arm 34, Figs. 1 and 2, which is mounted pivotally at 35 in connection with a stand 36 supported by the pairs of supporting rails 11, 11. A spring 37 connected to the said pivoted supporting arm operates to press the upper feed-disk downward toward the upper surface of plate 31, and ensures proper engagement of the feed-disk with the leather passing over such plate. Stand 36 is held in place upon rails 11, 11, by means of a clamp 38, and is adjustable lengthwise of said rails to enable the upper feed-disk to be correctly positioned, forwardly or rearwardly, relative to the cutting point.

The strip-like portions of leather which at first are cut from the irregular projecting portions, corners, etc., of the leather, and the continuous strip s, Fig. 4, which subsequently is cut from the rounded circular disk-shape which the leather is caused to assume, are guided from the cutting point between side-walls or flanges 33, 33, in connection with the plate 31, and pass away through a conducting trough formed of extensions of said plate and flanges.

The machine is furnished with an inclined guide for the purpose of guiding projecting portions, corners, and the like, of the revolving sheet of leather downward as they approach the cutting point in the machine, so as to ensure their proper entry between the upper fed-disk and the cutter, and the plate 31. As illustrated, such guide is constituted by the lower run of an endless band or belt 39 which is extended from a pulley 40 that is fast with the upper feed-disk 14 to a second pulley 41 that is mounted in a more elevated position at the rear of such feed-disk. This endless band or belt moves at the same surface speed as the upper feed-disk and the peripheral portions of the leather, and its lower run guides and presses down the projections, corners, etc., of the leather so that they enter beneath the upper feed-disk and the plate 31 without displacement, the marginal portions of the leather being thereby held down flat, without becoming bent or turned over upon themselves or adjoining portions of the leather. Pulley 41 is fast upon a shaft 42, Fig. 3, mounted in a bearing in connection with a stand 43 that is mounted upon rails 11, 11, with capacity for adjustment toward and from the upper feed-disk. Such capacity enables the shaft 42 and pulley 41 to be positioned so as to maintain the inclined belt under the required degree of tension.

For the purpose of wiping down any upstanding projecting portions of the leather as they approach the cutting point, to thereby ensure that they shall pass in beneath the lower run of the inclined band or belt 39, I provide a tapered wheel 44, Figs. 1, 2, 3 that is mounted at the rear of the cutting point upon a shaft 45 which in turn is mounted in a bearing in connection with a stand 46 attached to rails 11, 11, with capacity for adjustment frontward and rearward. This wheel 44 is rotated by means of a pulley 441 fixed thereto and a driving band 442 passing around such pulley and a second pulley, 443, fixed to the revolving shaft 42.

Referring now to the "center" $x$, Fig. 3: This is mounted upon a carriage that is movable in the guideway $y$, Fig. 3, toward and from the cutter. With the center is combined means whereby as the center is rotated the carriage and center are fed automatically toward the cutter at a rate properly proportioned to the width of the strip which is being cut from the marginal portion of the leather. The center is engaged with the central portion of the revoluble table, and means is provided also for connecting the central portion of the leather with the center, so that whether the lower feed-disk is acting through engagement with the revoluble table, or both feed-disks are acting simultaneously upon both the revoluble table and the leather, or the upper feed-disk alone is acting upon the leather, rotation of the center is ensured. Means is provided, in addition, for automatically unclutching the revoluble table from the center when the carriage and center have arrived at a predetermined point in their travel.

In the case of the construction shown in Figs. 6 to 19, the center is provided with an upright shaft portion 48, shown separately in Figs. 7, 8 and 9, Sheet 4, that is fitted and revolves within bearings in the upper and lower portions 49, 50 of the carriage. Fig. 7 shows said shaft portion in side elevation, Fig. 8 is a top view thereof, and Fig. 9 is a bottom view thereof. The upper portion 49 of the carriage is located between the parallel guide-bars 51, 51, which are grooved to receive the lateral flanges of said portion 49. A spur-pinion 52 upon the upright shaft portion 48 of the center is in engagement with a large spur-gear 53 supported by the carriage, and with such spur-gear is combined a spur-pinion 54. A longitudinally extending rack-bar 55 fixed to one of the guide-bars 51 is engaged by pinion 52, and thereby as the center is rotated the carriage and center, and consequently the revoluble table and the leather connected with the center, are fed toward the cutter.

The engagement of the center with the revoluble table in such manner as to compel the two to revolve in unison is provided for in the illustrated construction, Figs. 6 to 18, by clutching the central portion of the revoluble table to the upper end of the shaft-portion 48 of the center. In this instance, to provide for such clutching the said upper end is formed with a radial flange 56 above the guide-bars 51, 51, and also is formed with a central hole 57, Figs. 7 and 8, having the wall thereof screw-threaded. A head-portion shown separately in Figs. 10 and 11, Sheet 4, is provided, it being formed with a radial flange 58, a hub 59 below said flange, and a screw-threaded extension 60 below said hub. A central hole or eye of proper size to receive the said hub 59 is formed in the revoluble table 2, and two washers, 62, 621, Figs. 6, 12 to 15, and 18, are fastened by screws 63, 63, Fig. 6, to the said table around such hole or eye, at top and bottom, respectively, of the table. The hub 59 of the head-portion occupies the said central hole or eye of the revoluble table and the holes of the washers, and the screw-threaded extension 60 is screwed into the hole 57 of the shaft-portion until the lower end of the hub brings up against a seat around the said hole 57, without however, pinching the washers so as to prevent turning movement of the revoluble table relative to the shaft-portion. The simple clutch shown in Figs. 6, 10, 11, 12, 13, 14, 15, and 18 comprises as its chief elements a strip 64 of steel, shown in Figs. 6 and 18, occupying a rectangular hole 65, Fig. 10, made transversely through the head-portion, such hole being enough larger vertically than the thickness of the strip to permit vertical movement of the strip within the hole. The radial flange 58 of the head-portion is at its under side grooved diametrically at 66, Fig. 11, in extension of the hole 65, the said groove being adapted to receive the strip 64. The top washer 62 likewise is formed in its upper side with a diametrical groove 661, Figs. 12 and 13, adapted to receive the strip 64. The strip is bent slightly in the direction of its length, so that normally one end-portion thereof will occupy the groove 661 in washer 62 and the other end-portion thereof will occupy the groove 66 in the under side of the flange 58 of the head-portion. Thus, by means of the clutching strip 64 the central portion of the revoluble table will be clutched to the revoluble center, so that in consequence of the revolution of said table produced through the action of the lower feed-disk, the center will be caused to revolve, producing by means of the pinions, gear, and rack which have been described a traveling or traversing movement of the carriage 50 and the center, as well as of the revoluble table and the sheet material thereon, toward the cutter.

For the engagement of the leather or other sheet material 3 with the center, the head-portion of the center is provided with a screw-threaded stud 61, Figs. 6, 10, 11, and 18, rising centrally therefrom. A cylindrical block 67, Figs. 6, 16, 17, and 18, is provided for application to the said upstanding central stud 61, the said block having a screw-threaded hole 68 made vertically therethrough to fit the said stud. For the application of the leather or other sheet material a hole is made through the latter as indicated in Figs. 6 and 18 to accommodate the stud, and the leather or other sheet material is passed down around the stud until it rests upon the flange 58, the block 67 being then applied to the stud and screwed down until the leather is clamped with sufficient firmness between the block and the flange 58. Thereby the leather is clamped to the shaft-portion of the center, so as to cause the leather and the center to revolve in unison with each other.

In order to provide for automatic disconnection or unclutching of the revoluble table from the shaft-portion of the center at the desired point in the travel of the center toward the cutter, I have provided unclutching devices comprising a rod 69, Figs. 6 and 18, occupying a central bore or longitudinal passage within the shaft-portion 48 of the center, with its upper end close to the under side of the clutch-strip 64 and its lower end projecting down below the lower end of the shaft-portion 48. For the actuation of the pin 69, a lever 70 is disposed beneath the lower end of the pin, such end resting on the top of the lever. The lever is mounted pivotally at 71, Fig. 18, upon a support 72 connected to the carriage. It is guided in its vertical movements by means of a stirrup 73 extending downward from the lower part 50 of the carriage, the bottom of the said stirrup constituting a rest for the lever. The lever is furnished with a roll 74 adapted to engage the inclined end of a rail 75 in the travel of the carriage toward the cutter, and to ride up onto the top of the rail so that thereby the lever 70 and pin 69 are moved upward and the clutch-strip 64 is pressed up from the diametrical groove 661 of the top washer 62, Figs. 12 and 13, into the diametrical groove 66, Fig. 11, in the flange 58 of the head-portion of the center, thereby unclutching the revoluble table from the center.

It is intended that the unclutching of the revoluble table shall occur after the hide or skin, or other material operated upon, has been reduced to circular form. Until that stage is reached in the reduction of the hide or skin, or other piece of material, the actuation of the revoluble table by means of the engagement of the lower feed-disk therewith is depended upon to cause the hide or skin, or the like, to rotate, and to bring about the travel of the center along the table. After the arrival of such stage, and when the engagement of the upper feed-disk with the hide or skin, or the like, has become effective to rotate the same and the center, etc., the unclutching is caused to take place. At such stage, also, the operator lowers the lower feed-disk out of engagement with the revoluble table. Thereafter, the engagement of the upper feed-disk with the hide or skin, or the like, is depended upon to produce the required rotation, etc.

To provide for disengagement of the pinion 54 from rack 55 when required, and reengagement therewith, the said pinion, together with the gear 53 with which it is connected are mounted upon an arm 76 which in turn is hung upon the shaft-portion 48 by means of bearing portions fitting the said shaft-portion at 761 and 762, respectively, Figs. 6 and 18, below and above the spur-pinion 52. This mode of mounting the said arm 76 enables it, together with the pinion 54 and the gear 53 mounted thereon, to be swung horizontally so as to disengage the pinion 54 from the rack 55 and reengage it therewith. The pinion 54 is held normally in engagement with the rack 55 by means of a contracting spiral spring 77 having one end thereof engaged with a screw 78 projecting from the free end of a rearwardly projecting arm 501 of the arm 76 and the other end thereof engaged with a screw 781 projected from carriage 50. To provide for the convenient actuation of the arm 76 to effect the disengagement of pinion 54 from the rack 55, a horizontal arm 79 is pivoted as at 80, Fig. 19, to the rearwardly projecting arm 501 of the lower portion of the carriage, the said arm 79 having a lateral projection 791 having a notch 792 adapted to engage a downward projection 81 from arm 76. For the actuation of the arm 79 an endless cord 821 extends in opposite directions from the arm 79, around a set of sheaves 83, 83, below the bed 1, (see Figs. 1 and 2) arranged so that one portion of the said cord extends lengthwise of the machine, parallel with the guideway y, sufficiently near the front of the bed 1 to enable it to be reached and grasped by the operator. By pulling upon the cord 821 in the proper direction, the lateral projection 791 of arm 79 may be caused to act against the projection 81 to swing the arm 76 sufficiently to disengage pinion 54 from rack 55, to permit the carriage and center to be shifted by the operator into the desired position lengthwise of the machine without rotation of the center. The entrance of projection 81 into notch 792 holds the arm 76 locked with the gearing disconnected. This action may be utilized for the purpose of moving the carriage and center, together with the connected revoluble table and sheet of leather, into any desired starting position relative to the cutter.

A weight 831 suspended by means of a pulley 84 in a loop or bight of a cord 85, having one end thereof made fast to the under side of the bed 1 at 86, the said cord extending from the weight over a guide sheave 87 at the under side of the said bed, and having its other end engaged with a hook 88, Figs. 18 and 19, on the carriage, acts with a tendency to draw the carriage and center toward the end of the guideway y opposite that at which the cutter is located, and by opposing yieldingly the advancing movement of the carriage and center toward the cutter takes up any backlash there may be in the interengagement of the toothed gears and rack, thereby ensuring a uniform rate of travel of the carriage and uniformity in the width of the strip cut from the leather or other sheet material operated upon.

In starting operations, a hide or skin of leather having been connected with the center, and the center together with the revoluble table and leather having been shifted by the operator to introduce the margin of the revoluble table between the plate 31 and the lower feed-disk 13, the latter occupying at such time the depressed position in which it is shown in Fig. 4, the operator by means of the handle 25 operates the rocker 23 to close the said lower feed-disk upwardly against the revoluble table. The said table thereby is clamped against the under side of the plate 31, so that the rotation of the said feed-disk causes the revoluble table, the center, and the hide or skin of leather, to revolve around the axis of the center. Simultaneously with the said revolution, the center, revoluble table, and hide or skin are advanced toward the cutter at the rate provided for in order to bring about the cutting of the leather spirally. As the revoluble table and hide or skin rotate, and are fed transversely with reference to the cutter, the corners and other projecting portions are brought around successively, and slipping over the lifter 32 onto the top of the plate 31, and between the said plate and the upper feed-disk, are engaged by the latter, so as thereby to be fed with certainty past the cutter, so that a narrow strip is cut from each corner or other projecting portion as it comes around. The disk or wheel 44 operates to deflect any upstanding corners or projecting portions down so that they will pass under the inclined lower run of the band or belt 39 working alongside the upper feed-disk, and said portion of such band or belt operates to guide the corners and other projecting parts downward so as to insure their proper entry between the upper feed-disk and the guide-plate 31. The corners or other projecting portions of the hide or skin are gradually reduced as a result of successive strips being cut from the same, until the remainder of the hide or skin has been given an approximately regular circular form. Following this, a continuous strip is cut from the remainder of the hide or skin, until a small disk of six or seven inches in diameter is all that is left, whereupon the operation is discontinued.

As will be clear from what has already been stated herein, in the primary stages of the cutting, the engagement of the lower feed-disk with the margin of the revoluble table is relied upon to revolve the latter, and thereby revolve the center and the hide or skin, until the hide or skin has been reduced to a circular form whereupon the continuous engagement of the upper feed-disk with the marginal portion of the leather will produce a continuous feeding action tending to rotate the leather, center, etc. As soon as the hide or skin has been reduced to the circular form, or shortly thereafter, the operator operates the rocker 23 to depress the lower feed-disk out of engagement with the apron, and at such stage the automatic unclutching of the revoluble apron from the center occurs, following which the hide or skin and center, and revoluble table will be revolved through the engagement of the upper feed-disk with the margin of the leather.

What is claimed as the invention is:—

1. A machine for cutting sheet material spirally into a continuous strip comprising, essentially, a cutter, a revoluble table for supporting the sheet material, a bed upon which the said revoluble table rests and along which it is adapted to travel toward and from the cutter and a center for the said table and the sheet material having a progressive advancing movement toward the cutter which provides for the spiral cutting.

2. A machine for cutting sheet material spirally into a continuous strip comprising, essentially, a cutter, a revoluble table which supports the sheet material and which together with the sheet material is advanced progressively toward the cutter to provide for the spiral cutting, a bed upon which the said revoluble table rests and along which it is adapted to travel toward and from the cutter and a cutting table separating the sheet material from the revoluble table at the cutting point in the machine.

3. A machine for cutting sheet material spirally into a continuous strip comprising, essentially, a cutter, a revoluble table which supports the sheet material and which together with the sheet material is advanced progressively toward the cutter to provide for the spiral cutting, a cutting table by which the sheet material is supported clear of the revoluble table at the cutting point in the machine, and a lifter by which corners or projecting portions, and the like, of the sheet material are lifted to pass over the said cutting table.

4. A machine for cutting sheet material spirally into a continuous strip comprising, essentially, a cutter, a revoluble table which supports the sheet material, a center for the said table and the sheet material having a progressive advancing movement toward the cutter which provides for the spiral cutting, and table-revolving means engaging with the table approximately at the cutting point in the machine.

5. A machine for cutting sheet material spirally into a continuous strip comprising, essentially, a cutter, a revoluble table which supports the sheet material, a center for said table and the sheet material having a progressive advancing movement toward the cutter which provides for the spiral cutting, and means adjacent the cutting point in the machine acting on the marginal portion of the sheet material to revolve the sheet material and table and feed the former to the action of the cutter.

6. A machine for cutting sheet material spirally into a continuous strip comprising, essentially, a cutter, a revoluble table which supports the sheet material, a center for said table and the sheet material having a progressive advancing movement toward the cutter which provides for the spiral cutting, table-revolving means engaging with the table approximately at the cutting point in the machine, and means adjacent the said point acting on the marginal portion of the sheet material to feed the latter revolubly to the action of the cutter.

7. A machine for cutting sheet material spirally into a continuous strip comprising, essentially, a cutter, a revoluble table which supports the sheet material, a center for said table and the sheet material having a progressive advancing movement toward the cutter which provides for the spiral cutting, a feed-disk which through engagement with the table adjacent the cutting point revolves the table and center, means for placing the said feed-disk in and out of action, and a feed-disk which engages with the sheet material adjacent the cutting point and is adapted through such engagement to rotate the sheet material and table.

8. A machine for cutting sheet material spirally into a continuous strip comprising, essentially, a cutter, a revoluble table which supports the sheet material, a center for the said table and sheet material, means actuated by the rotation of the center to give the same a progressive advancing travel toward the cutter which provides for the spiral cutting, a feed-disk which through engagement with the table adjacent the cutting point revolves the table and center, means for placing the said feed-disk in and out of action, a feed-disk which engages with the sheet material adjacent the cutting point and is adapted through such engagement to rotate the sheet material and table, and means for unclutching the revoluble table from the center at a predetermined point in the travel of the center.

9. In combination, a carriage, a center supported thereby, means for causing the carriage to travel actuated by revolution of the center, means for connecting the sheet material to said center, a revoluble table, means substantially as described connected with the center for engaging with the central portion of the table to clutch the latter and the center together, and means operated at a predetermined point in the travel of the carriage to unclutch the revoluble table from the center.

10. In combination, a cutter, a cutting table, a revoluble table which works below said cutting table, and a lifter by which projecting portions of sheet material revolving with said revoluble table are lifted to the upper side of the cutting table.

11. In combination, a cutter, a cutting table, a feed-disk above said table, a revoluble table working below said cutting table, means for revolving said revoluble table, and a lifter by which projecting portions of sheet material revolving with said revoluble table are lifted to the upper side of the cutting table.

12. In combination, a cutter, a cutting table, a feed-disk above said table, a revoluble table working below said cutting table, a lifter by which projecting portions of sheet material revolving with said revoluble table are lifted to the upper side of the cutting table, and means for deflecting such portions downward to pass beneath the feed-disk and cutter.

13. In combination, a cutter, a cutting table, a feed-disk above said table, a revoluble table working below said cutting table, a lifter by which projecting portions of sheet material revolving with said revoluble table are lifted to the upper surface of the cutting table, and an inclined traveling belt by which such portions are deflected downward and caused to pass beneath the feed-disk and cutter.

14. In combination, a cutter, a cutting table, a feed-disk above said table, a revoluble table working below said cutting table, a lifter by which projecting portions of sheet material are lifted to the upper surface of the cutting table, and a revolving wheel by which they are deflected downward so as to pass beneath the feed-disk and cutter.

15. In combination, a cutter, a cutting table, a feed-disk above said table, a revoluble table working below said cutting table, a lifter by which projecting portions of sheet material revolving with said revoluble table are lifted to the upper surface of the cutting table, and an inclined traveling belt and a revolving wheel by which such portions are deflected downward and caused to pass beneath the feed-disk and cutter.

16. In combination, a cutter, a carriage, a center for the sheet material in connection with said carriage, means actuated through the revolution of the center for advancing the carriage and center toward the cutter, a revoluble table for supporting said sheet material, means for clutching said revoluble table to the center, a cutting table adjacent the cutter beneath which the revoluble table works and over which the sheet material extends, a lower feed-disk engaging with the revoluble table at the under side of the cutting table, an upper feed-disk engaging with the sheet material at the upper side of the cutting table, and means whereby at a predetermined point in the advance of the carriage the revoluble table is unclutched from the center.

17. In combination, a cutter, a carriage, a center for the sheet material in connection with said carriage, means actuated through the revolution of the center for advancing the carriage and center toward the cutter, a revoluble table for supporting said sheet material, means for throwing said lower feed-disk into and out of operation for revolving the revoluble table, means for clutching said revoluble table to the center, a cutting table adjacent the cutter beneath which the revoluble table works and over which the sheet material extends, a lower feed-disk engaging with the revoluble table at the under side of the cutting table, an upper feed-disk engaging with the sheet material at the upper side of the cutting table, and means whereby at a predetermined point in the advance of the carriage the revoluble table is unclutched from the center.

18. In combination, a cutter, a carriage, a center for the sheet material in connection with said carriage, means actuated through the revolution of the center for advancing the carriage and center toward the cutter, a revoluble table for supporting said sheet material, a movable support for said lower feed-disk operable manually to move the said disk into and out of engagement with the revoluble apron, means for clutching said revoluble table to the center, a cutting table adjacent the cutter beneath which the revoluble table works and over which the sheet material extends, a lower feed-disk engaging with the revoluble table at the under side of the cutting table, an upper feed-disk engaging with the sheet material at the upper side of the cutting table, and means whereby at a predetermined point in the advance of the carriage the revoluble table is unclutched from the center.

In testimony whereof I affix my signature in presence of two witnesses.

FRANK W. MERRICK.

Witnesses:
CHAS. F. RANDALL,
ELLEN O. SPRING.